US006448888B1

(12) United States Patent
Horner et al.

(10) Patent No.: US 6,448,888 B1
(45) Date of Patent: Sep. 10, 2002

(54) CARBON MONOXIDE SENSOR FOR VEHICLE COMPARTMENT

(76) Inventors: Sylvia Horner, 509 Swan Ct., Fortville, IN (US) 46040; Reginald L. Horner, 509 Swan Ct., Fortville, IN (US) 46040

( * ) Notice: Subject to any disclaimer, the term of this patent is extended or adjusted under 35 U.S.C. 154(b) by 0 days.

(21) Appl. No.: 09/571,148

(22) Filed: May 16, 2000

(51) Int. Cl.[7] ............................ B60Q 1/00; G08B 17/10

(52) U.S. Cl. .................... 340/425.5; 340/632; 340/438; 180/271

(58) Field of Search .............................. 340/425.5, 632, 340/438; 180/271; 73/23.2

(56) References Cited

U.S. PATENT DOCUMENTS 5,199,397 A * 4/1993 Shelef et al. ........... 123/198 D
5,333,703 A * 8/1994 James et al. ................ 340/438
5,739,756 A * 4/1998 Margulies .................... 340/632
6,208,256 B1 * 3/2001 Fleming et al. ............. 340/632

* cited by examiner

*Primary Examiner*—Donnie L. Crosland
(74) *Attorney, Agent, or Firm*—Michael C. Bartol

(57) ABSTRACT

A carbon monoxide(CO) sensor system and method in combination with a vehicle passenger compartment. At least one CO sensor within the vehicle compartment is utilized to activate a warning light on the dashboard of a vehicle. After a short period of time, and audible warning is given to the occupants of the vehicle. After a further short period of time, power to the vehicle engine is cut off to eliminate the source of the dangerous CO condition.

1 Claim, 2 Drawing Sheets

CARBON MONOXIDE SENSOR FOR VEHICLE COMPARTMENT

BACKGROUND AND OBJECTS OF THE INVENTION

The present invention is generally related to the carbon monoxide(CO) sensor arts and, in particular, to a novel system and method for sensing the presence of CO in a vehicle passenger compartment and responding to such hazardous condition.

Prior art systems to perform such functions as opening a garage door or shutting off a furnace in response to excess CO levels are known in the art.

However, a vehicle passenger compartment sensor and warning system are not apparently shown in the prior art teachings.

Accordingly, it is an object of the present invention to demonstrate an efficient warning and control system for a vehicle passenger compartment which will, after two warnings and the elapse of a short period of time, cut off the vehicle engine.

It is also an object of the invention to set forth a system which may be built into a new vehicle or added to an existing vehicle in a cost-effective manner for widespread commercial appeal.

These and other objects and advantages of the invention will be apparent to those of skill in the art from the description which follows.

PRIOR ART PATENTS AND DESIGNS

U.S. Pat. No. 5,576,739 teaches the use of a carbon monoxide sensor and logic circuitry which is used to control the operation of a garage door.

The prior art does not show the multiple alarm, time delay and engine cutoff features as described in this specification.

SUMMARY OF THE INVENTION

A system and method are described wherein carbon monoxide sensor means is placed within the passenger compartment of a vehicle.

The sensor means is used to control a multiple level alarm system to alert an operator.

After a predetermined time delay, the vehicle engine may be cut off if the carbon monoxide levels remain too high.

BRIEF DESCRIPTION OF THE DRAWING FIGURES

FULL DESCRIPTION OF A PREFERRED EMBODIMENT

Figure 1:
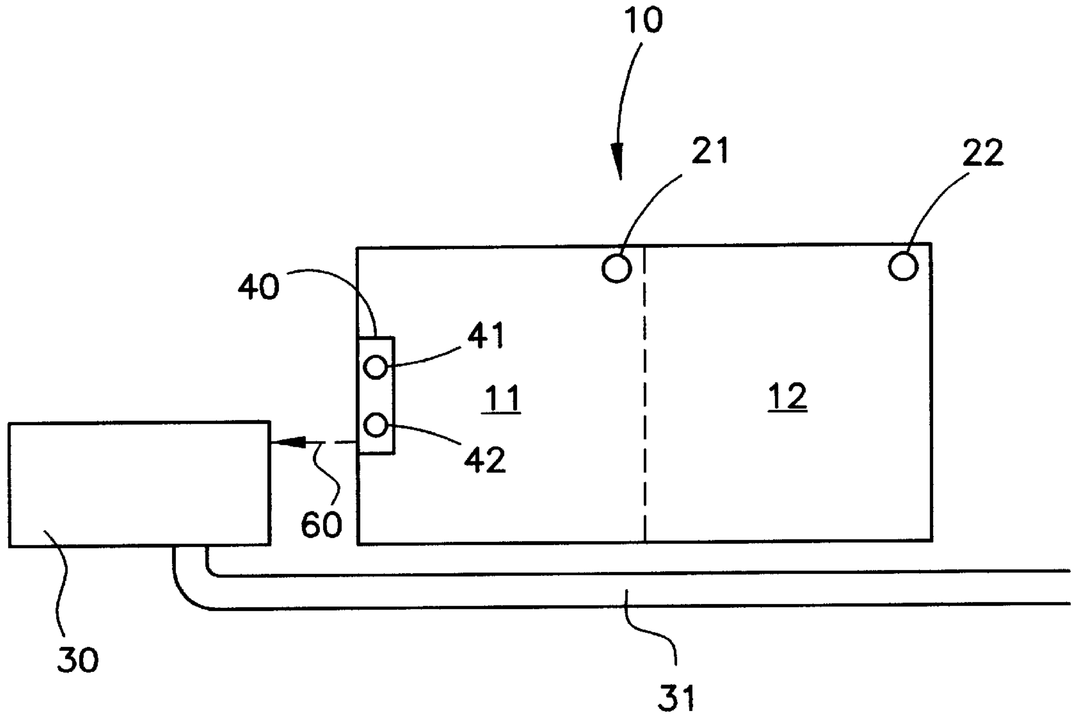
FIG. 1 shows a vehicle passenger compartment having at least one carbon monoxide sensor placed therein.

Referring to the schematic diagram of FIG. 1, a vehicle passenger compartment 10 is shown as having a forward area 11 and a rear area 12.

Each area of the passenger compartment has a carbon monoxide sensor 21,22 located therein.

The vehicle passenger compartment further includes a dashboard 40 which has a signal light 41 and an audible alarm 42 mounted thereon.

The engine 30, which has an exhaust pipe 31, may be cut off via line 60 in an operational manner to be later described.

Figure 2:
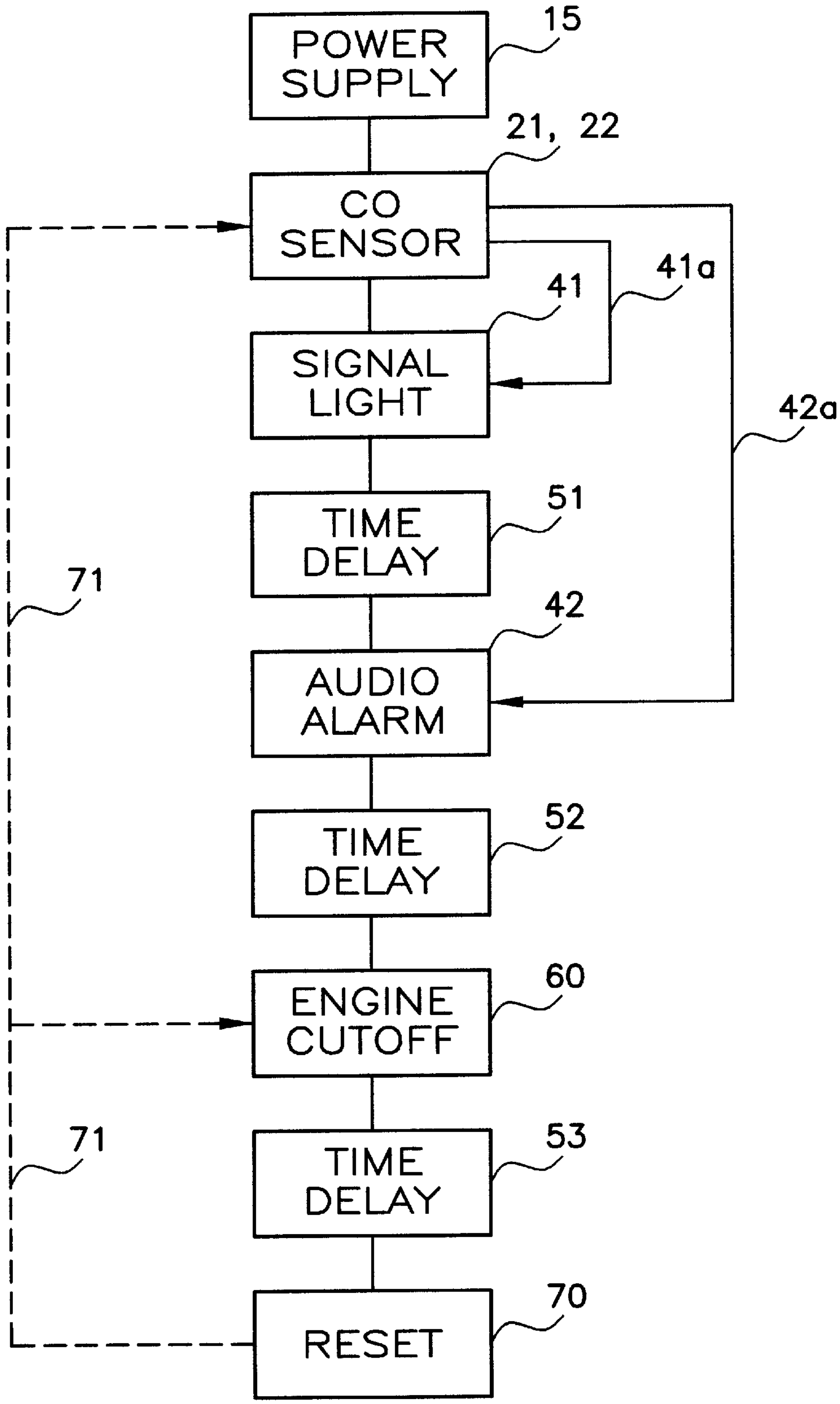
FIG. 2 is a schematic block diagram view of the logic and method steps used in practice of the invention via electronic control means.

The aforementioned components are electrically connected so as to operate in the manner shown in the block diagram of FIG. 2.

As shown in FIG. 2, a battery/electrical source 15 is used to power and activate the carbon monoxide sensors 21 and 22.

Upon one of the sensors 21,22 sensing excess CO in the passenger compartment 10, signal light 41 is activated. The warning light 41 may be turned off via line 41*a* when carbon monoxide returns to a zero or safe level.

After a short period of time, e.g. 15 seconds, which is determined by an electronic time delay element 51, an audible alarm 42 is activated. The audible alarm 42 may be deactivated via line 42*a* when CO returns to a zero or safe level.

After a further time delay, e.g. 30 seconds, which is determined by a second electronic time delay element 52, an engine cutoff switch 60 is activated to cut off power to the engine.

After a third time delay, e.g. 5 minutes, which is determined by a third electronic time delay element 53, a reset switch 70 is activated to enable engine restart and reset the CO sensor system as indicated by lines 71.

Thus, ample time is given the motorist to pull over if the vehicle is in motion.

It will be understood by those of skill in the art that the electronic control method of FIG. 2 is such that if the signal light and/or the audible alarm are turned off via lines 41*a* and/or 42*a*, then the system does not advance to the engine cutoff stage.

The particular electronic components shown schematically in FIG. 2 are of types known in the control arts.

However, the particular system and method taught herein are not shown or suggested in the prior art.

The advantages of the above-described system and method are thus as follows:

a) the system may be built into a new vehicle or added to an existing vehicle, b) the method taught may be effected via economical electronic components of types known in the art so the resulting system will have widespread commercial appeal, c) the vehicle operator is given different warning levels of a dangerous condition and ample time to avoid a potentially serious hazard.

While the above-described system and method are described as for use in combination with an automotive vehicle, it will be appreciated that the principles set forth will be applicable to other systems such as aircraft.

While a particular system and method have been described, it is intended in this specification to broadly cover all equivalent systems and methods which would reasonably occur to those of skill in the art.

The invention is further defined by the claims appended hereto.

We claim:

1. In combination with a vehicle having a passenger compartment(10), an engine(30) and an engine exhaust pipe(31), carbon monoxide sensor means(21,22) for detecting excess levels of carbon monoxide within said passenger compartment, signal light indicator means(41) electronically connected to said carbon monoxide sensor to warn an operator of a dangerous condition, a first time delay means(51) electronically connected to said combination, audible alarm means(42) connected to said first time delay for providing a further warning to an operator, second time delay means(52) electronically connected to said audible alarm means, engine cutoff means(60) connected to said second time delay means for cutting off power to said engine upon the continued presence of a hazardous carbon monoxide condition, wherein said vehicle passenger compartment(10) has a forward area(11) having the first carbon monoxide sensor(21) therein and a rear area(12) having the second carbon-monoxide sensor(22) therein, wherein each of said carbon monoxide sensors(21,22) has a line means(41*a*) extending to the signal light indicator (41) for turning off the indicator(41) when carbon monoxide returns to a zero or safe level in the forward and rear areas, wherein each of said carbon monoxide sensors(21,22) has a line means(42*a*) extending to the audible alarm(42) for turning off the audible alarm when carbon monoxide returns to a zero or safe level in the forward and rear areas, wherein the combination includes a third time delay means(53) having a duration of five minutes for automatically activating a reset switch(70) to enable engine restart, the combination being devoid of manual clearing means for the reset switch(70).

* * * * *